United States Patent
Ahlgren et al.

(10) Patent No.: US 7,867,357 B2
(45) Date of Patent: *Jan. 11, 2011

(54) POLYMER COMPOSITION FOR PEROXIDE BLEACHING OF CELLULOSIC FIBRE MATERIAL AND PROCESSES FOR PEROXIDE BLEACHING

(75) Inventors: Jonni Ahlgren, Vaasa (FI); Aarto Parén, Vaasa (FI); Jukka Jäkärä, Siivikkala (FI); Timo Härmä, Espoo (FI); Ilkka Renvall, Espoo (FI)

(73) Assignee: Kemira Oyj, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 12/651,957

(22) Filed: Jan. 4, 2010

(65) Prior Publication Data

US 2010/0108275 A1 May 6, 2010

Related U.S. Application Data

(62) Division of application No. 10/538,074, filed as application No. PCT/FI2004/000009 on Jan. 9, 2004, now Pat. No. 7,674,851.

(30) Foreign Application Priority Data

Jan. 10, 2003 (FI) ................... 20030039

(51) Int. Cl.
*D21C 5/02* (2006.01)
*D21C 3/00* (2006.01)
*D06L 3/02* (2006.01)
*C01B 15/00* (2006.01)

(52) U.S. Cl. ............... 162/5; 8/111; 162/6; 162/8; 162/13; 162/72; 162/78; 252/186.26; 252/186.27

(58) Field of Classification Search ............ 524/501, 524/502, 522, 523, 539, 500; 162/78, 5, 162/6, 8, 13, 72; 8/111; 252/186.26, 186.27

See application file for complete search history.

(56) References Cited

U.S. PATENT DOCUMENTS

| 4,347,099 A | 8/1982 | De Ceuster et al. |
| 4,363,699 A | 12/1982 | DeCeuster et al. |
| 6,120,556 A | 9/2000 | Nishino et al. |

FOREIGN PATENT DOCUMENTS

| DE | 3423452 A1 | 1/1986 |
| EP | 0 414 228 A2 | 2/1991 |
| EP | 0 801 169 A1 | 10/1997 |
| EP | 0 814 193 A2 | 12/1997 |
| EP | 0 841 321 B1 | 4/2001 |

*Primary Examiner*—Ana L Woodward
(74) *Attorney, Agent, or Firm*—Birch, Stewart, Kolasch & Birch, LLP

(57) ABSTRACT

The present invention relates to a polymer composition for peroxide bleaching of a cellulosic fiber material, said composition being in the form of a stable aqueous polymer solution obtained by bringing in an aqueous medium a first polymer (A) comprising a partly or totally acidic homopolymer of acrylic acid, methacrylic acid or maleic acid, or a copolymer of acrylic acid and/or methacrylic acid with an unsaturated dicarboxylic acid, into contact with a second polymer (B) comprising a polylactone of a poly-alfa-hydroxyacrylic acid in solid form or as a moist powder or as a slurry, said polymer solution having a pH of at most 5. The invention also relates to peroxide bleaching processes.

39 Claims, No Drawings

POLYMER COMPOSITION FOR PEROXIDE BLEACHING OF CELLULOSIC FIBRE MATERIAL AND PROCESSES FOR PEROXIDE BLEACHING

This application is a Divisional of application Ser. No. 10/538,074, filed on Nov. 18, 2005 now U.S. Pat. No. 7,674,851 and for which priority is claimed under 35 USC §120. Application Ser. No. 10/538,074 is a national phase of PCT Application No. PCT/FI2004/000009 filed on Jan. 9, 2004 under 35 USC §371 which claims priority from Finland Application No. 20030039 filed on Jan. 10, 2003. The entire contents of each of the above-identified applications are hereby incorporated by reference.

BACKGROUND OF THE INVENTION

1. Field of the Invention

The present invention relates to a stable polymer composition for peroxide bleaching of a cellulosic fibre material. The stable polymer composition can be used in alkaline peroxide bleaching of mechanical, chemical, chemi-mechanical and de-inked pulps and in deinking of recycled fibers without using silicate as a stabilizer. The present invention also relates to a process for bleaching a cellulosic fibre material with a peroxide compound in an aqueous alkaline medium by using said stable polymer composition.

2. Description of the Related Art

Alkaline silicate solutions normally called water glass have been used in stabilizing hydrogen peroxide solutions, which are used in alkaline peroxide bleaching of mechanical pulps. Nowadays it is more common not to make a pre-prepared bleaching liquor, but water glass is fed separately, when mechanical pulps are bleached with peroxide and alkali.

Water glass is used alone or together with peroxide in de-inking of recovered papers. Sometimes the de-inked pulp is also bleached with alkaline peroxide.

The use of water glass in alkaline peroxide bleaching of chemical pulps has been published, but the method cannot be utilized in full scale, since the silicate can cause very severe precipitation problems. Another disadvantage with water glass is that when the bleaching liquors are recycled and ultimately fed into the recovery boiler, where the so-called black liquor from the cooking process after concentration is burned, the silicate will cause severe scaling and thus decrease the heat transfer in the recovery boiler, which in worst case can cause an explosion of the recovery boiler. Further the use of the silicate can cause highly dusting.

If the silicates, e.g., in form of the water carry-over, will enter the paper making process, they will disturb the paper-making process, e.g., by precipitating on hot surface, causing holes in the paper reel etc.

It is known that hydrogen peroxide will decompose very rapidly in an alkaline milieu in the presence of heavy metal (transition metal) ions. The most abundant of these ions in pulps are iron and manganese. The copper ion is also very detrimental for alkaline hydrogen peroxide, but normally it can enter the process only via used process waters.

It is also known that iron will start to precipitate already below pH 7, first in colloidal form. The formed iron hydroxides, oxyhydroxides etc are much more catalytically active than iron ions. Also manganese can, at least partly, be in precipitated form, but it has been shown that in the presence of hydrogen peroxide, manganese should be in dissolved form.

The theory of the function of water glass varies, but one theory is that water glass will deactivate the catalytic surface of iron and other heavy metal ion "precipitates". In order to avoid the detrimental effect of manganese ions, a chelating agent is often introduced into the bleaching process or the pulp is pretreated with a chelating agent. The most common chelating agents are EDTA and DTPA, which belong to the group of polyaminopolycarboxylates. The corresponding phosphonates, EDTMPA and DTPMPA can be also used, but they are much more expensive than the polyaminopolycarboxylates. They have also the disadvantage that they contain phosphorus, which is not a wanted component, when the environmental regulations are becoming stricter and stricter.

According to the above there is a need to replace water glass (silicates) in alkaline peroxide process and in pulping processes, which use water glass, e.g., in de-inking of recovered paper. There have been suggestions to use phosphonates, but they should be used in quite high dosages and the phosphorus problem in the waste waters would still remain. Since the common phosphonates are non-biodegradable, there has been much studies about they adverse effect on mobilizing heavy metals, e.g. from sediments in waterways.

One solution to stabilize alkaline hydrogen peroxide solutions or to avoid water glass is based on the use of poly-alfa-hydroxyacrylic acid (PHAA). Typically this substance is used as a sodium salt of poly-alfa-hydroxyacrylic acid made from the corresponding lactone (an internal ester) by alkaline treatment (such as NaOH). Thus, the sodium salt of poly-alfa-hydroxyacrylic acid typically appears only as an aqueous alkaline solution. The lactone is not soluble in water. When the name PHAA is mentioned, it normally does not refer to the free acid, but to a salt thereof.

U.S. Pat. No. 4,363,699 describes a process for stabilizing alkaline solutions of peroxidic compounds used for bleaching wherein an alkali salt of a poly-alfa-hydroxyacrylic acid is added to the solution as a stabilizer.

EP 0 842 321 B1 describes a method of stabilizing alkaline bleaching liquors containing oxygen and/or hydrogen peroxide and three different types of chelating agents. The first one can be a phosphonate or an aminopolycarboxylic acid, and the second one can for example be poly-alfa-hydroxyacrylic acid used as a salt. The third one is a protein derivative.

EP 0 814 193 discloses a silicate-free stabilizing agent for peroxide-bleaching procedures, comprising a) a first component selected from homopolymers of alpha-hydroxyacrylic acid and copolymers of alpha-hydroxyacrylic acid with other comonomers, and water soluble salts and polylactones of the mentioned homo- or copolymers in combination with b) a second component selected from homopolymers and copolymers of acrylic acid, methacrylic acid and maleic acid, copolymers of at least one of the above-mentioned acids with other comonomers and salts of above-mentioned homo- and copolymers, and c) a third component selected from the common chelating acids DTPA and TTHA and salts thereof, and optionally d) a fourth component selected from water-soluble magnesium salts. The poly-alfa-hydroxyacrylic acid is used as its sodium salt.

EP 0 814 193 also describes a method of bleaching a fibre material comprising pretreating the fibre material with an aqueous solution of the above mentioned stabilizing agent typically for a period of one hour and at a pH of between 6 and 11, preferably between 7 and 10.5, and then bleaching the pretreated fibre material with an aqueous solution of a peroxide bleaching agent The pretreated fibre material is preferably washed before the bleaching.

EP 0 814 193 additionally describes a method of bleaching a fibre material comprising bleaching the fibre material with an aqueous alkaline peroxide bleaching liquor comprising the above mentioned stabilizing agent.

DE 3423452 discloses a solution for avoiding the use of water glass comprising a stabilizing mixture of a poly-alpha-hydroxyacrylic acid (PHAA) and a water soluble homopolymer of acrylic or methacrylic acid or a copolymer of acrylic acid and/or maleic acid. The salts, especially the sodium salt of PHAA and the sodium salt of the polycarboxylate polymer are mixed together. Chelating agents can be added to the mixture and thus an improved stabilizer mixture for bleaching processes is obtained. According to DE 3423452 the bleaching process is carried out by using an alkaline peroxide bleaching liquor containing said stabilizing mixture.

Since it is known that hydrogen peroxide will very easily decompose in alkaline solutions, a ready made bleaching mixture is not a very feasible choice when bleaching pulp with hydrogen peroxide in an alkaline milieu.

In EP 0 801 169 poly-alpha-hydroxyacrylic acid or the corresponding salts or polylactone is used in the alkaline peroxide bleaching of a chemical pulp at a temperature of above 100° C. and in the presence of a compound chosen from potassium hydroxide, sodium hydroxide and alkali metal or alkaline-earth metal carbonates.

It has been found that the alkaline earth metal ions can be very detrimental for PHAA. When paper is made from a mechanical pulp, is it very common to feed the so-called white water from the paper making process to the pulping process. The white water contains very often high contents of calcium ions when calcium containing coating pigments or fillers have been used in the paper making process. If a chemical pulp is bleached, the pulp will contain very high amounts of calcium ions, which are released to certain extent in each bleaching stages. Also the recycling of the different waste water streams will contribute the amount of alkaline earth metal ions.

If PHAA is used alone it will bind calcium and magnesium ions and render PHAA less effective due to the content of alkaline earth metal ions. The reason of this is not known, since e.g. the sodium salt of PHAA and a sodium salt of a conventional polyacrylic acid have almost the same calcium binding ability in the presence of magnesium at neutral pH, while the degree of binding of magnesium is much weaker but stronger for the polyacrylate than for the sodium salt of PHAA. [T. Tamura et al., Polymer International 46 (1998), 353-356].

According to the present invention it was surprisingly found that by using a polycarboxylate made by homopolymerization of acrylic or methacrylic acid or more preferably by copolymerization of acrylic and/or methacrylic acid with an unsaturated dicarboxylic acid, such as maleic acid, and adding this polymer to the polylactone, the efficiency of the polylactone, probably in the form of acidic PHAA could be maintained. This means that a smaller amount of the effective and expensive component, i.e. PHAA, could be used, when the product made from the polylactone and the polycarboxylate was used than when using PHAA made from the polylactone alone.

The prior art teaches that when PHAA or the corresponding polylactone is used together with a polycarboxylate made, e.g., by homopolymerization of acrylic acid or made by copolymerization of acrylic acid with an unsaturated dicarboxylic acid, such as e.g. maleic acid, the acids are normally provided in form of salts, e.g., as alkali salts. This means that, if the polymerization is carried with acidic monomers, they have to be treated with e.g. alkali in order to get sufficient water solubility. This will add an extra process step.

PHAA as a sodium salt and the polycarboxylate polymer as a sodium salt can be used in the bleaching process separately, but this will require two separate pumping and controlling systems. The two polymers can also be made as ready made mixture, but the polycarboxylate will be in the form as sodium salt.

THE INVENTION

Now it has been found that a raw acidic polymer made by homopolymerization of acrylic acid, methacrylic acid or maleic acid or more preferably by copolymerization of acrylic and/or methacrylic acid with an unsaturated dicarboxylic acid, such as maleic acid, can be added directly to the polylactone, which, as discussed above, normally is used to make a salt of PHAA, such as a sodium salt, and this mixture can be directly used instead of water glass in alkaline peroxide bleaching of chemical, mechanical, chemi-mechanical and de-inked pulps and in the de-inking of recycled fibers. The composition according to the invention will have an acidic pH.

This method is a very efficient way to make a polymer composition, since the polylactone can easily be made at high solids content, which is not easy for the sodium salt of PHAA and which thus can be transported more cheaply than, e.g., the alkali salt of PHAA. No neutralization agent is needed for commercial use of this composition and the composition can be made at higher solids content than the sodium salt of PHAA.

An extra advantage with the use of this slightly acidic polymer composition is that the alkaline hydrogen peroxide process can be more easily adjusted for the right pH by adding alkali in the bleaching process than by using the alkali salts, such as, e.g., sodium salt of PHAA and the conventional salts of polycarboxylic acids, which need a more sophisticated control to reach the optimal pH at the alkaline peroxide bleaching.

The polymer composition according to the invention can be used in the bleaching of all kind pulps, chemical pulp, mechanical pulp, chemi-mechanical pulp and deinked pulps, which use hydrogen peroxide as the bleaching agent. The composition is also suitable in deinking of recycled pulps, in which water glass and hydrogen peroxide is commonly used.

The process of the invention can be practiced as a single stage of bleaching or in a two-stage process, where the pre-bleached pulp is entering the second stage. Any consistency can be used, but it is most preferable to use medium consistency in the first stage and high consistency in the second stage.

The bleaching can be preceded by a treatment with chelating agent in order to reduce the amount of transition metals entering the bleaching process. If the manganese content is still high after this kind of treatment, chelating agents can be added to the bleaching either with the polymer composition or separately.

The polymer composition will give at least as good bleaching results as a mixture of the salts of PHAA and common polycarboxylate with the same polymer contents.

According to the invention the polymer composition according to the invention should preferably be fed into the process separately from the alkali. A ready-made bleaching mixture is not preferred, since the alkali will precipitate the polymer and render the bleaching ineffective. The polymer can be fed diluted with water, but it has been surprisingly found that the best effect can be achieved, when the polymer is fed as a concentrated solution.

DETAILED DESCRIPTION OF THE INVENTION

In one aspect of the present invention there is provided a polymer composition for peroxide bleaching of a cellulosic fibre material, said composition being in the form of a stable aqueous polymer solution obtained by bringing in an aqueous medium a first polymer (A) comprising a partly or totally acidic homopolymer of acrylic acid, methacrylic acid or maleic acid, or a copolymer of acrylic acid and/or methacrylic acid with an unsaturated dicarboxylic acid, into contact with a second polymer (B) comprising a polylactone of a poly-alfa-hydroxyacrylic acid in solid form or as a moist powder or as a slurry, said polymer solution having a pH of at most 5.

According to the invention the stable polymer solution can be obtained by adding said polymer (B) in solid form or as a moist powder or as a slurry to a solution of said polymer (A) or vice-versa. It is also possible to obtain the stable polymer solution by preparing said first polymer (A) by homopolymerization of acrylic acid, methacrylic acid or maleic acid, or by copolymerisation of acrylic acid and/or methacrylic acid with an unsaturated dicarboxylic acid in the presence of said second polymer (B).

The polymer solution of the present invention preferably has a pH of between 2 and 5, more preferably between 3 and 4.5.

Preferably said first polymer (A) comprises a raw polymer obtained from the homopolymerization of acrylic acid, methacrylic acid or maleic acid or from the copolymerization of acrylic acid and/or methacrylic acid with an unsaturated dicarboxylic acid, said raw polymer having an acidic pH, preferably a pH of at most 5. This polycarboxylic acid polymer can be made using conventional radical polymerization techniques.

In addition to the above monomers, the copolymer can also contain any other copolymerizable monomer units, such as acrylamide, (meth)acrylic esters or methyl vinyl ether, to name a few. The term "copolymer" here refers to a polymer containing two or more different types of monomer units.

The mixing of the two polymers can be utilized using any applicable mixing technique to get a uniform mixture.

The first polymer (A) can have a molecular weight of at least 4000, preferably at least 10000, and more preferably at least 30000. The molecular weight can be even higher, although with very high molecular weights the viscosity of the product will increase considerably at high concentrations.

The second polymer (B) can have a molecular weight of at least 5000, preferably at least 10000, and more preferably at least 15000. As the second polymer (B), i.e., the polylactone, is insoluble in water, the molecular weights have been measured for the corresponding sodium salt obtained by alkaline hydrolysis of the polylactone.

Preferably the first polymer (A) comprises a copolymer of acrylic acid and/or methacrylic acid with maleic acid, wherein the molar ratio of acrylic acid and/or methacrylic acid to maleic acid is from 80:20 to 20:80, preferably from 70:30 to 50:50.

The ratio between polymer (A) and polymer (B) can be varied to a large extent, but the ratio should be selected so that good alkaline-earth metal, especially calcium binding by the polymer (A) can be obtained in order to achieve an optimal bleaching effect by the polymer mixture.

The amount of the polycarboxylate (polymer (A)) will depend on the alkaline-earth metal, especially the calcium content in the process, and the share of the polylactone (polymer (B)) can be 1 to 50% by weight, preferably 5 to 30% by weight and most preferably 10 to 20% by weight of the total amount of the polymers in the mixture.

The concentration of the first and second polymers (A) and (B) in the polymer solution, i.e., the active material content, can be at least 10%, preferably at least 15% and more preferably at least 20% by weight.

In a second aspect of the present invention there is provided a process for bleaching a cellulosic fibre material with a peroxide compound in an aqueous alkaline medium, comprising a step of adding to the cellulosic fibre material a polymer composition in the form of a stable polymer solution obtained by bringing in an aqueous medium a first polymer (A) comprising a partly or totally acidic homopolymer of acrylic acid, methacrylic acid or maleic acid, or a copolymer of acrylic acid and/or methacrylic acid with an unsaturated dicarboxylic acid, into contact with a second polymer (B) comprising a polylactone of a poly-alfa-hydroxyacrylic acid in solid form or as a moist powder or as a slurry, said polymer solution having a pH of at most 5.

According to a preferred embodiment of this process the peroxide compound and an alkaline substance are added to the cellulosic fibre material after the addition of the stabilizing composition.

In a third aspect of the present invention there is provided a process for bleaching a cellulosic fibre material with a peroxide compound in an aqueous alkaline medium, comprising treating the cellulosic fibre material with an alkaline substance, a peroxide compound and a stabilizing composition, said composition being in the form of a stable polymer solution obtained by bringing in an aqueous medium a first polymer (A) comprising a partly or totally acidic homopolymer of acrylic acid, methacrylic acid or maleic acid, or a copolymer of acrylic acid and/or methacrylic acid with an unsaturated dicarboxylic acid, into contact with a second polymer (B) comprising a polylactone of a poly-alfa-hydroxyacrylic acid in solid form or as a moist powder or as a slurry, said polymer solution having a pH of at most 5.

The polymer composition used in the processes of the present invention is as defined above.

According to the invention the polymer composition is used in an amount corresponding to 0.05 to 10 kg of the polymers as active material per ton of dry cellulosic fibre material, preferably in an amount corresponding to 0.1 to 5 kg per ton of dry cellulosic fibre material, and most preferably in an amount corresponding to 1 to 5 kg per ton of dry cellulosic fibre material.

The cellulosic fibre material can be a chemical, mechanical, chemi-mechanical or deinked pulp. The cellulosic fibre material can also be any regenerated cellulose material, such as viscose, flax or cotton.

The peroxide bleaching of mechanical pulps with the polymer composition according to the invention can comprise all kind of mechanical pulps, e.g. stone groundwood pulp (SGW), refiner mechanical pulp (RMP), pressure groundwood (PGW), thermomechanical pulp (TMP), but also chemically treated high-yield pulps such as chemithermomechanical pulp (CTMP). The invention can also be practiced in refiner bleaching of mechanical pulps and in alkaline peroxide mechanical pulp (APMP), in which wood chips are impregnated with alkaline peroxide solution before refining. The invention is also useful in bleaching of deinked pulps. Deinked pulp can be made using mixed office waste (MOW), newsprint (ONP), magazines (OMP) etc. as raw material and the polymer mixture of the invention can be used in any process stage where peroxide is used. In these applications the invention is very advantageous, since the biggest obstacle to the use of hydrogen peroxide in these applications has been that water glass cannot be used, since the water glass will, e.g., fasten to the refiner plates and thus making the process unpractical.

The bleaching of mechanical pulps can be carried out at a temperature of 30-90° C., preferably at a temperature of 50-90° C. The bleaching can be carried out at a consistency of choice, but it is most preferably to carry out the bleaching at a high consistency, i.e., about 30% or higher. Bleaching can also be carried in two stages with a dewatering stage between the stages. The stages can be carried out at a consistency of choice, but it is most preferably to use medium consistency in the first stage and a high consistency in the second stage. This makes it possible to remove the detrimental substances efficiently. A chelating agent treatment and dewatering can precede the bleaching stage and thus improve the bleaching performance. The consistency of this pretreatment is preferably around 10% in order to ensure an efficient metal removal. The pH should be from 3 to 7, preferably 4 to 6.5 and most preferably from 4.5 to 6, if conventional chelating agents are used. Conventional chelating agents, such as polyaminopolycarboxylates, such as EDTA or DTPA or the corresponding phosphonic acids such as EDTMPA and DTPMPA can be used as the chelating agents.

The ratio between the alkali and hydrogen peroxide can vary in a wide range, depending on raw materials and degree of bleaching. Also alternative alkali sources, like sodium carbonate, can be utilized.

The polymer composition shall most preferably be fed separately from the alkali feed. This can be put into practice by having different feeding points at the pumping section. Another possibility is to dilute the alkali, add hydrogen peroxide and add almost simultaneously the polymer composition, so that the polymer composition has no possibility to precipitate before the chemicals have been mixed with the pulp.

The residence time in the bleaching can vary within a wide range, from 30 to 240 minutes, preferably from 45 to 180 minutes and most preferably from 60 to 120 minutes. The residence time will also depend on the temperature used in the bleaching.

The bleaching of chemical pulp can be carried out at a temperature below 100° C. or at an elevated temperature from at 90 to 130° C., preferably from 95 to 120° C., i.e., so-called pressurized peroxide bleaching.

In a de-inking process the polymer composition according to the invention can be used in repulping or disperger or in a separate bleaching stage or any process stage where hydrogen peroxide is present.

The pH in the alkaline bleaching, including the de-inking in the presence of hydrogen peroxide, is from 7 to 13, preferably from 7 to 12, and more preferably from 7 to 11.

The present invention will be illustrated by following examples.

Example 1

A polyacrylate copolymer (copolymer A) was made using conventional radical copolymerization technique from acrylic acid and maleic acid in molar ratio 60:40. The weight average molecular weight of the copolymer was about 44000 g/mol. The copolymer solution was diluted to the active contents given in table 1, and the pH thereof was about 4. A moist polylactone powder, having a molecular weight of about 30000 g/mol and an active content of 67.6% by weight, was added to the copolymer A solutions listed in table 1 under vigorous stirring at room temperature. The active content ratio polylactone:copolymer A was 1:4. After addition of all polylactone mixing was continued under gentle stirring 1.5 h, during which all insoluble solids remained after vigorous stirring stage were dissolved. The final product mixtures had clear appearance, pH 3.9 and other properties listed in Table 1. Samples were stored at room temperature.

TABLE 1

| Exp. No. | Active content of copolymer A solution, % | Copolymer A solution in mixture, g | Moist polylactone in mixture, g | Active content of the final mixture, % | viscosity at 25° C. at once, mPas | viscosity at 25° C. after 1 week, mPas |
| --- | --- | --- | --- | --- | --- | --- |
| 786 A1 | 30 | 200 | 22.2 | 35 | >5000 | 4020 |
| 786 A2 | 25 | 200 | 18.5 | 30 | >5000 | 1080 |
| 786 A3 | 22 | 200 | 16.3 | 26 | 1550 | 360 |
| 786 A4 | 20 | 200 | 14.8 | 24 | 1410 | 306 |
| 786 A5 | 17 | 200 | 12.6 | 21 | 279 | 83 |

Example 2

A polyacrylate copolymer (copolymer A) was made using conventional radical copolymerization technique from acrylic acid and maleic acid in molar ratio 60:40. The weight average molecular weight of the copolymer was about 44000 g/mol. The copolymer solution was diluted to an active content 22%, and the pH was about 4. A moist polylactone powder, having a molecular weight of about 30000 g/mol and active content of 67.6% by weight, was added to the copolymer A solution under moderate stirring at 60° C. The active content ratio polylactone:copolymer A was 1:4. After addition of all polylactone mixing was continued. Insolubles vanished after 30 min. Samples were collected after 1 h, 2 h and 4 h. All samples had clear appearance and had properties listed in Table 2. Samples were stored at room temperature.

TABLE 2

| mixing time, h | pH | dry content, % | viscosity at 25° C. at once, mPas | viscosity at 25° C. after 3 d, mPas | viscosity at 25° C. after 1 week, mPas |
| --- | --- | --- | --- | --- | --- |
| 1 | 3.7 | 26.3 | 1290 | 591 | 561 |
| 2 | 3.8 | 26.5 | 651 | 561 | 544 |
| 4 | 3.9 | 26.5 | 531 | 518 | 524 |

Example 3

A polyacrylate copolymer (copolymer A) was made using conventional radical copolymerization technique from acrylic acid and maleic acid in molar ratio 60:40. The weight average molecular weight of the copolymer was about 44000 g/mol. The copolymer solution was diluted to an active content 22%, and the pH was about 4. A moist polylactone powder, having a molecular weight of about 30000 g/mol and an active content of 67.6% by weight, was added to the copolymer A solution under moderate stirring at 80° C. The active content ratio polylactone:copolymer A was 1:4. After addition of all polylactone mixing was continued. Insolubles vanished after 20 min. Samples were collected after 1 h, 2 h and 4 h. All samples had clear appearance and had properties listed in Table 3. Samples were stored at room temperature.

TABLE 3

| mixing time, h | pH | dry content, % | viscosity at 25° C. at once, mPas | viscosity at 25° C. after 1 d, mPas | viscosity at 25° C. after 3 d, mPas |
|---|---|---|---|---|---|
| 1 | 3.8 | 26.3 | 544 | 534 | 498 |
| 2 | 3.8 | 26.3 | 494 | 478 | 484 |
| 4 | 3.8 | 26.3 | 461 | 464 | 456 |

Example 4

A polyacrylate copolymer (copolymer A) was made using conventional radical copolymerization technique from acrylic acid and maleic acid in molar ratio 60:40. The weight average molecular weight of the copolymer was about 44000 g/mol. The copolymer solution was diluted to an active content of 21%, and the initial pH was about 4. Then the pH was raised to 4.8 using 50% sodium hydroxide solution.

A moist polylactone powder, having a molecular weight of about 30000 g/mol and an active content of 67.6% by weight, was added to the copolymer A solution under moderate stirring at 80° C. The active content ratio polylactone:copolymer A was 1:4. After addition of all polylactone mixing was continued, and samples were collected after 1 h and 4 h. Both samples had clear appearance and had properties listed in Table 4. Samples were stored at room temperature.

TABLE 4

| mixing time, h | pH | dry content, % | viscosity at 25° C. at once, mPas | viscosity at 25° C. after 2 d, mPas |
|---|---|---|---|---|
| 1 | 4.1 | 25.7 | 366 | 361 |
| 4 | 4.0 | 26.1 | 352 | 360 |

Reference Example 1

A polyacrylate copolymer (copolymer A) was made using conventional radical copolymerization technique from acrylic acid and maleic acid in molar ratio 60:40. The weight average molecular weight of the copolymer was about 44000 g/mol. The pH of the copolymer solution was initially about 4, and the pH was raised to 8 using sodium hydroxide. The copolymer solution was diluted to an active content of 30%. Moist polylactone powder, having a molecular weight of about 30000 g/mol and an active content of 67.6% by weight, was added to the copolymer A solution under vigorous stirring at room temperature. After addition of all polylactone mixing was continued 5 min. The active content ratio polylactone:copolymer A was 1:4.

The final product mixture was turbid and contained insolubles. The pH was 5.1 and dry content 35%, and it finally separated into two layers.

Reference Example 2

The samples obtained in example 2 were combined, and the pH of the solution was raised to 5.4 using sodium hydroxide. The solution became turbid, and after 4 days it was separated into two layers.

Reference Example 3

A polyacrylate copolymer (copolymer A) was made using conventional radical copolymerization technique from acrylic acid and maleic acid in molar ratio 60:40. The weight average molecular weight of the copolymer was about 44000 g/mol. The pH of the copolymer solution was initially about 4, and the pH was raised to 8 using sodium hydroxide. The copolymer solution was diluted to an active content 22%. Moist polylactone powder, having a molecular weight of about 30000 g/mol and an active content of 67.6% by weight, was added to the copolymer A solution under moderate stirring at 60° C. The active content ratio polylactone:copolymer A was 1:4. After addition of all polylactone mixing was continued, and samples were collected after 1 h, 2 h and 4 h. The pHs of all samples were between 5.4 and 5.5, viscosities between 400 and 500 mPas at 25° C. The samples were turbid at room temperature, and separated into two layers after 1 day.

Reference Example 4

The samples obtained in example 3 were combined, and pH of the solution was raised to 5.5 using sodium hydroxide. The solution became turbid and had viscosity 319 mPas at 25° C.

Reference Example 5

A polyacrylate copolymer (copolymer A) was made using conventional radical copolymerization technique from acrylic acid and maleic acid in molar ratio 60:40. The weight average molecular weight of the copolymer was about 44000 g/mol. The pH of the copolymer solution was initially about 4, and the pH was raised to 5.5 using sodium hydroxide. The copolymer solution was diluted to an active content 20 of %. Moist polylactone powder, having a molecular weight of about 30000 g/mol and an active content of 67.6% by weight, was added to the copolymer A solution under moderate stirring at 80° C. The active content ratio polylactone:copolymer A was 1:4. After addition of all polylactone mixing was continued, and samples were collected after 1 h and 2 h. Both samples had viscosity about 250 mPas at 25° C., were turbid at room temperature and separated into two layers after 1 day.

Example 5

Laboratory scale bleaching trials were conducted in plastic bags and in the case. The residual peroxide was determined using standard iodometric method. Brightness measurements were done according to SCAN standards using MINOLTA CM-3630 spectrophotometer.

A commercial TMP (spruce) sample having a brightness of 62.6 was bleached using the process conditions presented in Table 5 below. The pulp contained Ca 696 ppm, Fe 6.2 ppm, Mn 15.6 ppm and Cu 2.0 ppm. The chemicals were added in the order: polymer, NaOH, peroxide and each chemical was mixed well in the pulp before addition of the next chemical. The bleaching results expressed as residual $H_2O_2$ and brightness and yellowing are shown in Table 5.

TABLE 5

| Exp. No. | 50 | 51 | 52 |
|---|---|---|---|
| T, ° C. | 70 | 70 | 70 |
| t, min | 120 | 120 | 120 |
| Cs, % | 12 | 12 | 12 |
| Initial pH | 9.8 | 9.9 | 10.0 |
| Final pH | 8.2 | 8.0 | 8.0 |
| $H_2O_2$, kg | 25 | 25 | 25 |
| NaOH, kg | 25 | 25 | 25 |
| PHAA1, kg | 0.25 | 0 | 0 |
| MA-AA1, kg | 1 | 0 | 0 |
| Polymer mixture from Example 3 (after 2 h), kg | 0 | 1.25 | 0 |
| Polymer mixture from Example 4 (after 4 h), kg | 0 | 0 | 1.25 |
| Residual $H_2O_2$, kg | 7.4 | 13.6 | 12.9 |
| Residual NaOH, kg | 0.1 | 0.2 | 0.1 |
| Brightness ISO % | 69.1 | 70.1 | 70.3 |
| According to the invention | No | Yes | Yes |

The above amounts are calculated as kg active material on the same basis per dry ton.

PHAA1 is a water solution of the sodium salt of poly-alfa-hydroxyacrylic acid; Mw 20000.

MA-AA1 is a water solution of the sodium salt of the copolymer of maleic acid and acrylic acid in the molar ratio of 30:70; Mw 7000.

The results show, that the polymer composition according to this invention gives clearly better result (higher residual peroxide, higher brightness).

Example 6

The same pulp as in Example 5 was bleached using the process conditions presented in Table 6 below. The chemicals were added in the order: polymer, NaOH, peroxide and each chemical was mixed well in the pulp before addition of the next chemical. The bleaching results expressed as residual $H_2O_2$ and brightness are shown in Table 6.

TABLE 6

| | Exp. no. | | | | | | |
|---|---|---|---|---|---|---|---|
| | 32 | 33 | 34 | 35 | 36 | 37 | 38 |
| T, ° C. | 70 | 70 | 70 | 70 | 70 | 70 | 70 |
| t, min | 120 | 120 | 120 | 120 | 120 | 120 | 120 |
| Cs, % | 12 | 12 | 12 | 12 | 12 | 12 | 12 |
| Initial pH | 9.6 | 10.0 | 10.0 | 10.0 | 10.0 | 10.0 | 10.1 |
| Final pH | 8.1 | 8.5 | 8.0 | 8.0 | 8.0 | 8.0 | 8.4 |
| $H_2O_2$, kg | 25 | 25 | 25 | 25 | 25 | 25 | 25 |
| NaOH, kg | 25 | 25 | 25 | 25 | 25 | 25 | 25 |
| PHAA1, kg | 0.25 | 0 | 0 | 0 | 0 | 0 | 0.25 |
| MA-AA2, kg | 1 | 0 | 0 | 0 | 0 | 0 | 0 |
| MA-AA3, kg | 0 | 0 | 0 | 0 | 0 | 0 | 1 |
| 786 A.1, kg | 0 | 1.7 | 0 | 0 | 0 | 0 | 0 |
| 786 A.2, kg | 0 | 0 | 1.5 | 0 | 0 | 0 | 0 |
| 786 A.3, kg | 0 | 0 | 0 | 1.2 | 0 | 0 | 0 |
| 786 A.4, kg | 0 | 0 | 0 | 0 | 1.3 | 0 | 0 |
| 786 A.5, kg | 0 | 0 | 0 | 0 | 0 | 1.0 | 0 |
| Residual $H_2O_2$, kg | 5.1 | 13.2 | 14.4 | 13.9 | 13.9 | 12.1 | 5 |
| Residual NaOH, kg | 0.2 | 0.3 | 0.2 | 0.2 | 0.2 | 0.2 | 0.3 |
| Brightness ISO % | 70.6 | 71.9 | 71.1 | 70.3 | 70.8 | 70.5 | 69.4 |
| According to the invention | No | Yes | Yes | Yes | Yes | Yes | No |

The above amounts are calculated as kg active material on the same basis per dry ton.

PHAA1 is a water solution of the sodium salt of poly-alfa-hydroxyacrylic acid; Mw 20000.

MA-AA2 is a water solution of the sodium salt of the copolymer of maleic acid and acrylic acid in the molar ratio of 30:70; Mw 60000.

MA-AA3 is a water solution of the sodium salt of the copolymer of maleic acid and acrylic acid in the molar ratio of 50:50; Mw 44000.

786 A1, 786 A2, 786 A3, 786 A4 and 786 A5 refer to the polymer mixtures prepared in Example 1.

The results show that the polymer mixture according to the invention gives clearly better results (higher brightness, higher residual peroxide) than the reference trials no. 32 and no. 38.

The invention claimed is:

1. A process for bleaching a cellulosic fiber material with a peroxide compound in an aqueous alkaline medium, comprising a step of adding to the cellulosic fiber material a polymer composition in the form of a stable polymer solution obtained by contacting in an aqueous medium a first polymer (A) comprising a partly or totally acidic homopolymer of acrylic acid, methacrylic acid or maleic acid, or a copolymer of acrylic acid and/or methacrylic acid with an unsaturated dicarboxylic acid, with a second polymer (B) comprising a polylactone of a poly-alpha-hydroxyacrylic acid in solid form or as a moist powder or as a slurry, said polymer solution having a pH of at most 5.

2. The process of claim 1 wherein the peroxide compound and an alkaline substance forming said aqueous alkaline medium are added to the cellulosic fiber material after the addition of said polymer composition.

3. The process of claim 1 wherein the polymer solution has a pH of between 2 and 5.

4. The process of claim 1 wherein the polymer solution has a pH of between 3 and 4.5.

5. The process of claim 1 wherein the first polymer (A) comprises a raw polymer obtained from the homopolymerization of acrylic acid, methacrylic acid or maleic acid or from the copolymerization of acrylic acid and/or methacrylic acid with an unsaturated dicarboxylic acid, said raw polymer having an acidic pH of at most 5.

6. The process of claim 1 wherein the first polymer (A) has a molecular weight of at least 4,000.

7. The process of claim 1 wherein the first polymer (A) has a molecular weight of at least 10,000.

8. The process of claim 1 wherein the first polymer (A) has a molecular weight of at least 30,000.

9. The process of claim 1 wherein the second polymer (B) has a molecular weight of at least 5,000.

10. The process of claim 1 wherein the second polymer (B) has a molecular weight of at least 10,000.

11. The process of claim 1 wherein the second polymer (B) has a molecular weight of at least 15,000.

12. The process of claim 1 wherein the first polymer (A) comprises a copolymer of acrylic acid and/or methacrylic acid with maleic acid, wherein the molar ratio of acrylic acid and/or methacrylic acid to maleic acid is from 80:20 to 20:80.

13. The process of claim 1 wherein the first polymer (A) comprises a copolymer of acrylic acid and/or methacrylic acid with maleic acid, wherein the molar ratio of acrylic acid and/or methacrylic acid to maleic acid is from 70:30 to 50:50.

14. The process of claim 1 wherein the share of the second polymer (B) is from 1 to 50% by weight of the total amount of the first and second polymers (A) and (B).

15. The process of claim 1 wherein the sum of the concentration of the first and second polymers (A) and (B) in the polymer solution is at least 10% by weight.

16. The process of claim 1 wherein the sum of the concentration of the first and second polymers (A) and (B) in the polymer solution is at least 15% by weight.

17. The process of claim 1 wherein the sum of the concentration of the first and second polymers (A) and (B) in the polymer solution is at least 20% by weight.

18. The process of claim 1 wherein the polymer composition is used in an amount corresponding to 0.05 to 10 kg of the polymers as active material per ton of dry cellulosic fiber material.

19. The process of claim 1 wherein the polymer composition is used in an amount corresponding to 0.1 to 5 kg of the polymers as active material per ton of dry cellulosic fiber material.

20. The process of claim 1 wherein the cellulosic fiber material comprises a chemical, mechanical, chemi-mechanical or deinked pulp.

21. A process for bleaching a cellulosic fiber material with a peroxide compound in an aqueous alkaline medium, comprising treating the cellulosic fiber material with an alkaline substance, a peroxide compound and a stabilizing composition, said composition being in the form of a stable polymer solution obtained by bringing in an aqueous medium a first polymer (A) comprising a partly or totally acidic homopolymer of acrylic acid, methacrylic acid or maleic acid, or a copolymer of acrylic acid and/or methacrylic acid with an unsaturated dicarboxylic acid, into contact with a second polymer (B) comprising a polylactone of a poly-alfa-hydroxyacrylic acid in solid form or as a moist powder or as a slurry, said polymer solution having a pH of at most 5.

22. The process of claim 21 wherein the polymer solution has a pH of between 2 and 5.

23. The process of claim 21 wherein the polymer solution has a pH of between 3 and 4.5.

24. The process of claim 21 wherein the first polymer (A) comprises a raw polymer obtained from the homopolymerization of acrylic acid, methacrylic acid or maleic acid or from the copolymerization of acrylic acid and/or methacrylic acid with an unsaturated dicarboxylic acid, said raw polymer having an acidic pH of at most 5.

25. The process of claim 21 wherein the first polymer (A) has a molecular weight of at least 4,000.

26. The process of claim 21 wherein the first polymer (A) has a molecular weight of at least 10,000.

27. The process of claim 21 wherein the first polymer (A) has a molecular weight of at least 30,000.

28. The process of claim 21 wherein the second polymer (B) has a molecular weight of at least 5,000.

29. The process of claim 21 wherein the second polymer (B) has a molecular weight of at least 10,000.

30. The process of claim 21 wherein the second polymer (B) has a molecular weight of at least 15,000.

31. The process of claim 21 wherein the first polymer (A) comprises a copolymer of acrylic acid and/or methacrylic acid with maleic acid, wherein the molar ratio of acrylic acid and/or methacrylic acid to maleic acid is from 80:20 to 20:80.

32. The process of claim 21 wherein the first polymer (A) comprises a copolymer of acrylic acid and/or methacrylic acid with maleic acid, wherein the molar ratio of acrylic acid and/or methacrylic acid to maleic acid is from 70:30 to 50:50.

33. The process of claim 21 wherein the share of the second polymer (B) is from 1 to 50% by weight of the total amount of the first and second polymers (A) and (B).

34. The process of claim 21 wherein the sum of the concentration of the first and second polymers (A) and (B) in the polymer solution is at least 10% by weight.

35. The process of claim 21 wherein the sum of the concentration of the first and second polymers (A) and (B) in the polymer solution is at least 15% by weight.

36. The process of claim 21 wherein the sum of the concentration of the first and second polymers (A) and (B) in the polymer solution is at least 20% by weight.

37. The process of claim 21 wherein the polymer composition is used in an amount corresponding to 0.05 to 10 kg of the polymers as active material per ton of dry cellulosic fiber material.

38. The process of claim 21 wherein the polymer composition is used in an amount corresponding to 0.1 to 5 kg of the polymers as active material per ton of dry cellulosic fiber material.

39. The process of claim 21 wherein the cellulosic fiber material comprises a chemical, mechanical, chemi-mechanical or deinked pulp.

* * * * *